(12) United States Patent
McCoy et al.

(10) Patent No.: US 10,367,612 B2
(45) Date of Patent: Jul. 30, 2019

(54) PROCESS VARIABLE TRANSMITTER WITH SELF-LEARNING LOOP DIAGNOSTICS (71) Applicant: Rosemount Inc., Shakopee, MN (US)

(72) Inventors: Steven John McCoy, Eden Prairie, MN (US); David Richard Lauzon, Hopkins, MN (US)

(73) Assignee: ROSEMOUNT INC., Shakopee, MN (US)

( * ) Notice: Subject to any disclaimer, the term of this patent is extended or adjusted under 35 U.S.C. 154(b) by 388 days.

(21) Appl. No.: 14/871,850

(22) Filed: Sep. 30, 2015

(65) Prior Publication Data

US 2017/0093533 A1 Mar. 30, 2017

(51) Int. Cl.
*H04L 1/24* (2006.01)
*H04Q 9/00* (2006.01)
(Continued)

(52) U.S. Cl.
CPC .............. *H04L 1/24* (2013.01); *G05B 11/012* (2013.01); *G05B 19/0423* (2013.01);
(Continued)

(58) Field of Classification Search
CPC ...... H04L 1/24; H04L 43/0847; G05B 11/012
(Continued)

(56) References Cited

U.S. PATENT DOCUMENTS 3,959,772 A  5/1976  Wakasa et al. ............... 340/167
4,020,416 A  4/1977  Ottos ................................ 324/64
(Continued)

FOREIGN PATENT DOCUMENTS

CN  1598722  3/2005
CN  101147181  3/2008
(Continued)

OTHER PUBLICATIONS

Communication from European Patent Application No. 10736901.9, dated Feb. 17, 2012.
(Continued)

*Primary Examiner* — Stephanie E Bloss
(74) *Attorney, Agent, or Firm* — Westman, Champlin & Koehler, P.A.

(57) ABSTRACT

A two-wire process variable transmitter for use in an industrial process includes a process variable sensor configured to sense a process variable of a process fluid of the industrial process. Output circuitry provides an output on a two-wire process control loop which is related to the sensed process variable. Terminal voltage measurement circuitry measures a voltage at terminals of the process variable transmitter. The terminal voltage is a voltage measured across an electrical connection of the two-wire process variable transmitter to the two-wire process control loop. A microprocessor performs loop diagnostics on the two-wire process control loop based upon a loop current and the measured terminal voltage. The microprocessor determines coefficients of a polynomial equation which relates loop current and terminal voltage during normal operation of the two-wire process variable transmitter and performs subsequent diagnostics based upon the coefficients of the polynomial.

24 Claims, 8 Drawing Sheets

(51) Int. Cl.
  *G05B 11/01* (2006.01)
  *G08C 19/02* (2006.01)
  *H04L 12/26* (2006.01)
  *H04L 12/40* (2006.01)
  *G05B 19/042* (2006.01)

(52) U.S. Cl.
  CPC ........ *G08C 19/02* (2013.01); *H04L 12/40169* (2013.01); *H04L 43/0847* (2013.01); *H04Q 9/00* (2013.01); *G05B 2219/24069* (2013.01)

(58) Field of Classification Search
  USPC .............................................. 702/188, 183
  See application file for complete search history.

(56) References Cited

U.S. PATENT DOCUMENTS

| | | | |
|---|---|---|---|
| 4,086,570 | A | 4/1978 | Wakasa et al. ............. 340/172 |
| 4,403,297 | A | 9/1983 | Tivy ............................. 365/579 |
| 4,804,958 | A | 2/1989 | Longsdorf ............... 340/870.07 |
| 5,036,886 | A | 8/1991 | Olsen et al. ............ 137/625.65 |
| 5,223,798 | A | 6/1993 | McGinnis et al. ............ 324/713 |
| 5,339,025 | A | 8/1994 | Jones et al. ................ 324/71.6 |
| 5,382,912 | A | 1/1995 | Blain ............................. 324/713 |
| 5,386,188 | A | 1/1995 | Minneman et al. .......... 324/126 |
| 5,416,409 | A | 5/1995 | Hunter ....................... 324/158.1 |
| 5,434,774 | A | 7/1995 | Seberger ....................... 700/67 |
| 5,481,200 | A | 1/1996 | Voegele et al. ............... 327/718 |
| 5,573,032 | A | 11/1996 | Lenz et al. ................... 137/486 |
| 5,682,476 | A | 10/1997 | Tapperson et al. ...... 395/200.05 |
| 5,956,663 | A | 9/1999 | Eryurek ........................ 702/183 |
| 5,970,430 | A | 10/1999 | Burns et al. |
| 6,006,338 | A | 12/1999 | Longsdorf et al. ........... 713/340 |
| 6,014,612 | A | 1/2000 | Larson et al. ................ 702/183 |
| 6,026,352 | A | 2/2000 | Burns et al. ................. 702/182 |
| 6,176,247 | B1 | 1/2001 | Winchcomb et al. ......... 137/14 |
| 6,186,167 | B1 | 2/2001 | Grumstrup et al. ........ 137/487.5 |
| 6,437,956 | B1 | 8/2002 | Montrose ........................ 361/56 |
| 6,445,963 | B1 | 9/2002 | Blevins et al. ................. 700/44 |
| 6,512,358 | B2 | 1/2003 | Kofer et al. ............ 340/870.39 |
| 6,631,882 | B2 | 10/2003 | Mack ....................... 251/129.04 |
| 6,859,755 | B2 | 2/2005 | Eryurek et al. |
| 6,889,166 | B2 | 5/2005 | Zielinski et al. ............. 702/183 |
| 6,961,665 | B2 | 11/2005 | Slezak ............................ 702/61 |
| 7,018,800 | B2 | 3/2006 | Huisenga et al. ................ 435/6 |
| 7,046,180 | B2 | 5/2006 | Jongsma et al. ............. 341/141 |
| 7,089,086 | B2 | 8/2006 | Schoonover ................. 700/275 |
| 7,098,798 | B2 | 8/2006 | Huisenga et al. ............. 340/635 |
| 7,117,122 | B2 | 10/2006 | Zielinski et al. ............. 702/183 |
| 7,139,683 | B2* | 11/2006 | Pfundlin ................ G08C 19/02 702/189 |
| 7,280,048 | B2* | 10/2007 | Longsdorf ......... G01R 19/2509 340/635 |
| 7,321,846 | B1 | 1/2008 | Huisenga et al. ............ 702/183 |
| 7,464,721 | B2 | 12/2008 | Perry et al. ...................... 137/14 |
| 7,512,521 | B2 | 3/2009 | Duren et al. ................. 702/183 |
| 7,526,802 | B2 | 4/2009 | Mathiowetz et al. .......... 726/16 |
| 7,680,549 | B2 | 3/2010 | Kavaklioglu et al. .......... 700/26 |
| 7,991,582 | B2 | 8/2011 | Longsdorf .................... 702/183 |
| 8,180,466 | B2 | 5/2012 | Longsdorf ....................... 700/79 |
| 8,448,525 | B2 | 5/2013 | Wehrs et al. |
| 8,699,356 | B2 | 4/2014 | Smart et al. |
| 9,020,768 | B2 | 4/2015 | Arntson et al. |
| 9,182,256 | B2* | 11/2015 | Wehrs ................... G01D 21/00 |
| 9,217,653 | B2 | 12/2015 | Kleven et al. |
| 2002/0082799 | A1 | 6/2002 | Pramanik ...................... 702/130 |
| 2002/0121910 | A1 | 9/2002 | Rome et al. .................. 324/718 |
| 2003/0062494 | A1 | 4/2003 | Snowbarger et al. .......... 251/89 |
| 2004/0128110 | A1 | 7/2004 | Schulte et al. |
| 2005/0149295 | A1 | 7/2005 | Pfundlin et al. .............. 702/189 |
| 2008/0033693 | A1 | 2/2008 | Andenna et al. |
| 2010/0274528 | A1 | 10/2010 | Lecuyer et al. |
| 2011/0010120 | A1* | 1/2011 | Wehrs ................... G01D 21/00 702/65 |
| 2011/0010122 | A1 | 1/2011 | Ding ............................... 702/95 |
| 2012/0155285 | A1 | 6/2012 | Smart et al. .................. 370/242 |
| 2013/0046490 | A1 | 2/2013 | Arntson et al. ................. 702/58 |
| 2014/0022913 | A1* | 1/2014 | Mizoguchi ............. G01R 31/14 370/244 |
| 2014/0074303 | A1* | 3/2014 | Haynes .................... H04Q 9/00 700/286 |
| 2016/0127084 | A1* | 5/2016 | Jansen ..................... H04L 1/20 375/224 |

FOREIGN PATENT DOCUMENTS

| | | |
|---|---|---|
| CN | 101809418 | 8/2010 |
| CN | 102405446 | 4/2012 |
| CN | 102654410 | 9/2012 |
| CN | 102954814 | 3/2013 |
| CN | 102959363 | 3/2013 |
| CN | 103328992 | 9/2013 |
| DE | 42 09 785 | 9/1993 |
| DE | 298 24 256 | 7/2001 |
| EP | 1 396 771 | 3/2004 |
| GB | 2 224 853 | 5/1990 |
| GB | 2 260 416 | 4/1993 |
| JP | 55-023638 | 2/1980 |
| JP | 5-259941 | 10/1993 |
| JP | 2006-512679 | 4/2006 |
| JP | 2012-533121 | 12/2012 |
| WO | WO 1998/29785 | 7/1998 |
| WO | WO 2000/79352 | 12/2000 |
| WO | WO 2003/040657 | 5/2003 |
| WO | WO 2003/040851 | 5/2003 |
| WO | WO 2003/060851 | 7/2003 |
| WO | WO 2011/005938 | 1/2011 |

OTHER PUBLICATIONS

Notification of Transmittal of the International Search Report and Written Opinion from PCT Application No. PCT/US2010/041338, dated Nov. 7, 2011.

Communication from European Patent Application No. 10736901.9, dated Nov. 20, 2012.

Rules 161(1) and 162 EPC Communication from European Patent Office for corresponding European Patent Application No. 10 736 901.9, dated Apr. 10, 2013.

Rejection Notice in Japanese Patent Application No. 2012-519721, dated Dec. 25, 2013.

First Chinese Office Action for Chinese Patent Application No. 201080014378.7, dated Sep. 2, 2014.

Second Chinese Office Action for Chinese Patent Application No. 201080014378.7, dated Apr. 21, 2015.

Notification of Transmittal of the International Search Report and the Written Opinion of the International Searching Authority, or the Declaration for PCT/US2006/009604, dated Sep. 26, 2006.

"Functional Safety and Safety Integrity Levels", *Applications Note*, Apr. 2002, pp. 1-6.

Article entitled "Safety Field[T]2600T Pressure Transmitter Family", *ABB Instrumentation Spa*, 29 pages.

Fieldvue Instruments, article entitled "Improving Safety Instrumented System Reliability", *Emerson Process Management*, Feb. 2002, 8 pages.

Notification of Transmittal of the International Search Report and Written Opinion of the International Searhcing Authority from PCT/US2004/025289, dated Nov. 5, 2004.

"Safety Networks—Increase Productivity, Reduce Work-Related Accidents and Save Money" Online 2003, XP002353502, http://www.can-cia.org/devicenet/CIPWh.

Notification of Transmittal of International Search Report and Written Opinion of the International Searching Authroity for PCT/US2004/037289, dated Dec. 22, 2005.

Computer—From Wikipedia, the free encyclopedia; http://en.wikipedia.org/wiki/Computer; date Sep. 29, 2006; 12 pages.

Notification of Transmittal of International Search Report and Written Opinion of the International Searching Authroity for PCT/US2016/051855, dated Nov. 21, 2016.

(56) References Cited

OTHER PUBLICATIONS

Office Action from Chinese Patent Application No. 201610183782.6, dated May 31, 2018.
Office Action from European Patent Application No. 16771054.0, dated May 8, 2018.
Office Action from Chinese Patent Application No. 201610183782.6, dated Jan. 4, 2019.
Office Action from Japanese Patent Application No. JP 2018-516571, dated Mar. 6, 2019.
Office Action from Chinese Patent Application No. 201610183782.6, dated May 31, 2019.
Communication Pursaunt to Rule 114(2) EPC from European Patent Application No. 167710540, dated May 20, 2019.
Reference Manual, Rosemount 3051S Series Scalable Pressure, Flow, and Level Solution with HART® Protocol, 00809-0100-4801, Rev FA, Oct. 2010.

\* cited by examiner

PROCESS VARIABLE TRANSMITTER WITH SELF-LEARNING LOOP DIAGNOSTICS

BACKGROUND

The present invention relates to two-wire industrial process control transmitters used to monitor process variables in industrial processes. In particular, the present invention relates to a process variable transmitter which is capable of performing diagnostics on a two-wire process control loop.

Process variable transmitters are used in industrial processes to measure process one or more variables at remote locations in the "field", and transmit information related to the process variable back to a centralized location such as a control room. Example process variables include pressure, temperature, flow rate, level, etc.

In one configuration, the process variables are transmitted over a two-wire process control loop. The two-wire process control loop connects the process variable transmitter to the control room and, in addition to carrying communication, can also be used to provide power to the process variable transmitter. One example two-wire process control loop is a 4-20 mA process control loop in which the current level ranges between 4 and 20 mA and can be controlled to represent a sensed process variable. Another example process control loop operates in accordance with the HART® communication protocol. In a process control loop using HART® communication techniques, a digital signal is superimposed on a substantially DC current level carried on the loop. This allows the process control loop to carry both analog and digital signals. The digital signals can be used to transmit additional information from the process variable transmitter to the control room, or transmit data from the control room to the process variable transmitter. Another example two-wire process control loop operates in accordance with a Fieldbus communication protocol in which typically all of the data is carried in a digital format.

If the process control loop is not operating optimally, it is possible for errors to be transmitted by the process variable transmitter, or the loop may provide insufficient power for operation of the process variable transmitter. Other errors including partial failures or total failures may also arise due to problems associated with the two-wire process control loop. Therefore, it is desirable to perform diagnostics on the two-wire process control loop to ensure proper operation. Examples of such diagnostics and related aspects are shown and described in U.S. Pat. No. 5,481,200, issued Jan. 2, 1996 to Voegle et al. and US Publication No. US 2011/0010120, published Jan. 13, 2011 to Wehrs, U.S. Pat. No. 7,018,800, issued Mar. 28, 2006 to Huisenga et al., U.S. Pat. No. 7,321,846, issued Jan. 22, 2008 to Huisenga et al. and U.S. Pat. No. 7,280,048, issued Oct. 9, 2007 to Longsdorf et al., all assigned to Rosemount Inc.

SUMMARY

A two-wire process variable transmitter for use in an industrial process includes a process variable sensor configured to sense a process variable of a process fluid of the industrial process. Output circuitry provides an output on a two-wire process control loop which is related to the sensed process variable. Terminal voltage measurement circuitry measures a voltage at terminals of the process variable transmitter. The terminal voltage is a voltage measured across an electrical connection of the two-wire process variable transmitter to the two-wire process control loop. A microprocessor performs loop diagnostics on the two-wire process control loop based upon a loop current and the measured terminal voltage. The microprocessor determines coefficients of a polynomial equation which relates loop current and terminal voltage during normal operation of the two-wire process variable transmitter and performs subsequent diagnostics based upon the coefficients of the polynomial.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

DETAILED DESCRIPTION OF ILLUSTRATIVE EMBODIMENTS

An industrial process variable transmitter coupled to a two-wire process control loop measures a terminal voltage of the loop and performs diagnostics based upon the measured terminal voltage and a loop current flowing through the loop. Such diagnostics include detecting high leakage current or shunt current such as may occur when moisture or other contaminants are present in the terminal block or other junction boxes. Additionally, significant power supply voltage deviations can be detected.

Figure 1:
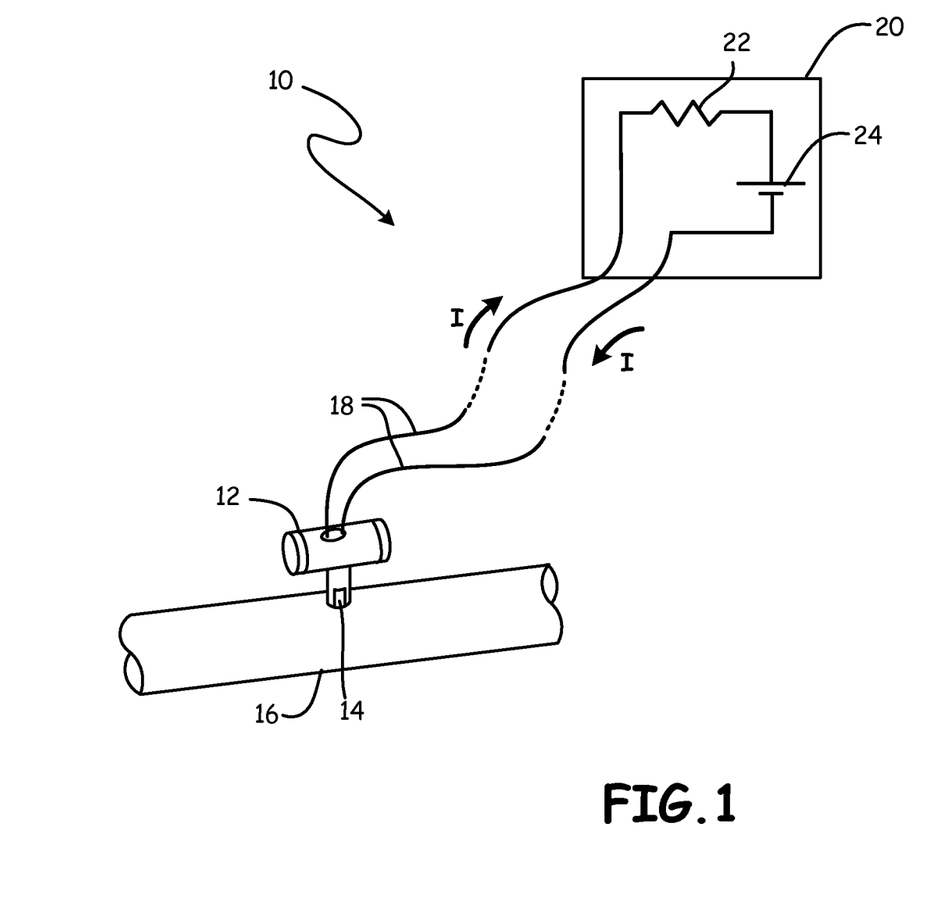
FIG. 1 is simplified block diagram showing a process control system including a process variable transmitter.

FIG. 1 is a simplified diagram of an industrial process control or monitoring system 10. System 10 includes a process variable transmitter 12 having a process variable sensor 14 arranged to sense a process variable of a process fluid. In this example, the process fluid is illustrated as contained in process piping 16. The process variable can be any appropriate property related to the process fluid such as flow rate, temperature, pressure, level, pH, etc. The process variable transmitter 12 couples to a two-wire process control loop 18 which carries a loop current I. In the example installation, the process variable transmitter is located at a remote location in the "field" of an industrial process and couples to a control room 20 at a centralized location through the two-wire process control loop 18. In this example, the control room 20 is illustrated as a sense resistor 22 and a voltage source 24. The transmitter 12 controls the loop current I such that the loop current is representative of the sensed process variable. For example, the loop current may range from 4 mA to 20 mA. In addition to the analog current level, digital information may also be carried on the process control loop 18 in accordance with the HART® communication protocol. This allows optional two way communication between the process variable transmitter 12 and the control room 20.

An automatic/self-learning loop characterization function is provided which is configured to generate and store baseline information related to power supply and loop resistance. The baseline information can be used to determine if the power supply, associated loop wiring, load resistance and electrical connections are all functioning properly such that the transmitter 12 can output a correct current value I at, for example, the minimum and maximum output levels used to indicate an alarm condition. This capability ensures that the transmitter is able to provide an output over a desired range of current I values.

Figure 2:
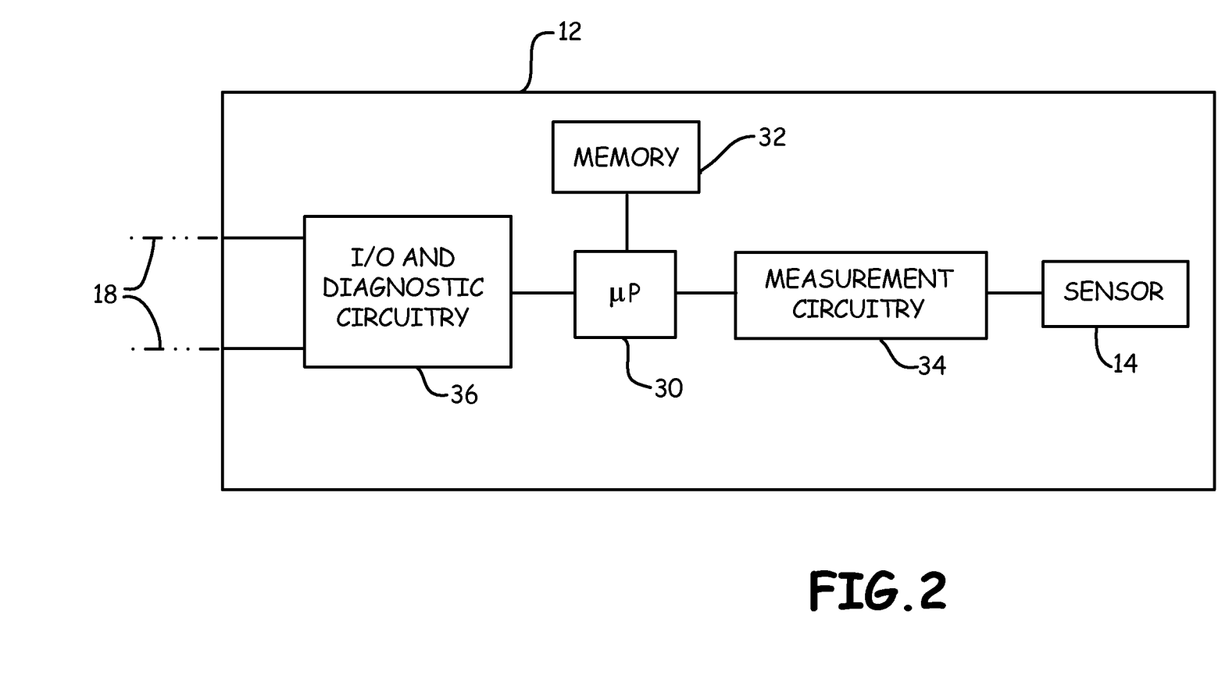
FIG. 2 is a block diagram of components of transmitter FIG. 1.

FIG. 2 is a simplified block diagram showing process variable transmitter 12. Process variable transmitter 12 includes a microprocessor which operates in accordance with instructions stored in a memory 32. Microprocessor 30 receives an output from the process variable sensor 14 through measurement circuitry 34. Measurement circuitry 34 can include analog and/or digital components to process the output from sensor 14. It is appreciated that sensor 14 may be located separate from the transmitter electronics housing but still constitute part of that transmitter. Further, process variable transmitter 12 includes I/O and diagnostic circuitry 36 which couples to two-wire process control loop 18. Microprocessor 30 couples to I/O and diagnostic circuitry and is configured to communicate over two-wire process control loop 18 using the circuitry 36. This communication can be either analog and/or digital and may optionally be bi-directional. One example communication technique is a 4-20 mA communication technique in which the process control loop 18 carries a signal ranging from 4-20 mA to represent a value related to the output from the process variable 14. A current level outside of this range can be used to indicate an alarm condition. A variation on this communication protocol is the HART® communication protocol in which digital information is modulated on to the analog current level carried on the two-wire process control loop 18.

Figure 3:
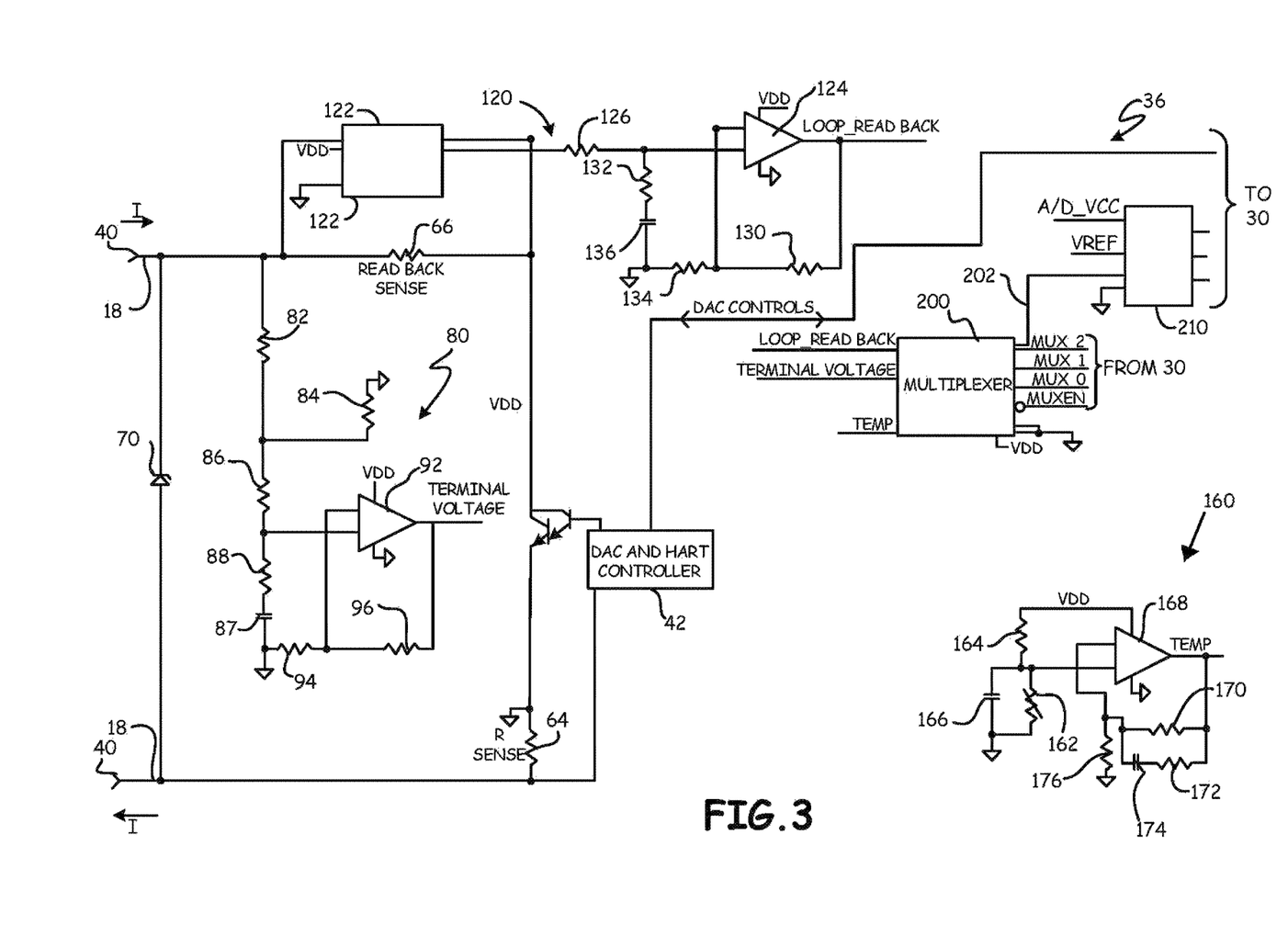
FIG. 3 is a simplified schematic diagram showing diagnostics circuitry in the transmitter of FIG. 1.

Pursuant to one embodiment, FIG. 3 is a more detailed block diagram of I/O and diagnostic circuitry. I/O and diagnostic circuitry couples to two-wire process control loop 18 through terminal 40. This provides Loop+ and Loop− connections to the two-wire process control loop 18. Microprocessor 30 (not shown in FIG. 3) couples to a digital to analog converter in HART® controller 42 which is used to control the current I flowing through loop 18. Digital and analog and HART® controller 42 provides an analog control signal. A loop readback and sense resistor 66 is also coupled in series with the two-wire process control loop 18 and discussed below in more detail. R sense 64 provides HART Controller 42 with feedback to set the loop current. A protection diode 70 is connected across the loop terminals 40. TERMINAL_VOLTAGE measurement circuitry 80 is configured to couple to terminals 40 and provide a TERMINAL_VOLTAGE output which is representative of the voltage across the terminals 40. Circuitry 80 includes a resistor divider network formed by resistors 82 and 84. Components 86, 88 and 87 are for safety and filtering. An amplifier 92 connects to the divider network and the feedback network 96 and 94 scale the divided voltage for input to 210. During operation, the TERMINAL_VOLTAGE output from differential amplifier 92 is representative of the voltage across terminals 40.

Circuitry 36 also includes optional read back circuit 120 which is configured to provide a LOOP_READ_BACK output related to the current level I flowing through two-wire process control loop 18. LOOP_READ_BACK circuitry 120 includes a difference amplifier 122 connected across the readback sense resistor 66. Difference amplifier 122 provides an output to operation amplifier 124 through a filtering set up with 126, 132, and 136. Operational amplifier 124 gain adjustment is made through resistors 130 and 134 to achieve appropriate values for 210. In another example, the loop current is not directly measured and simply determined based upon the desired current level set by microprocessor 30.

According to one embodiment, the temperature of the process variable transmitter 12 is also measured using temperature measurement circuitry 160. Temperature measurement circuitry 160 includes an RTD element 162 which has a resistance which varies as a function of temperature. Element 162 couples to voltage source VDD through a resistor 164. A capacitance 166 is connected across element 162. The voltage drop across element 162 is measured by operational amplifier 168. Resistors 170, 172, 176 and capacitor 174 provide filtering and gain of operational amplifier 168. Negative feedback is provided through resistors 170 and 172 and capacitor 174. The inverting input of operational amplifier 168 also couples to electrical ground to resistance 176. Circuitry 160 provides an output TEMP which is indicative of the temperature of element 162.

A multiplexer 200 is provided which has inputs which couple to the output from circuits 92 and 120. Multiplexer 200 is used to select from one of LOOP_READ_BACK, TERMINAL_VOLTAGE or TEMP outputs from the circuits. Channels of the multiplexer 200 is controlled using inputs to the multiplexer which are coupled to the microprocessor 30 shown in FIG. 2. An output 202 from the multiplexer 200 is connected to an analog to digital converter 210. Analog to digital converter converts an analog signal on output 202 into a digital format which is provided to the microprocessor 30 shown in FIG. 2. During operation, microprocessor 30 controls multiplexer 200 such that the various voltages are selected and coupled to the analog to digital converter 210 which then can be read by the microprocessor 30.

During operation, software run by microprocessor 30 is configured to make three measurements:

LOOP_READ_BACK: measure loop current. (optional)

TERMINAL_VOLTAGE: measure voltage present between the Loop+ and Loop− terminals of the transmitter 12.

TEMP: an optional measurement used for temperature compensation.

Various diagnostic techniques are known for use in monitoring an abnormal power condition on the 4-20 mA current loop. The diagnostics can be used to detect water or moisture in a terminal block of the transmitter, resistance changes due to poor connections as well as power supply changes. Example prior art techniques include comparison to thresholds or a baseline characterization. For example, a baseline configuration can be determined by an operator during a commissioning process. The terminal voltage and/or loop current levels can be set to one or more fixed values and a resulting loop current/terminal voltage measured. By selecting multiple fixed values for this characterization, a first order polynomial can be obtained. However, this characterization process requires that the transmitter be taken offline so that the specific current/voltage values can be set. This may be difficult for a user because the user may not know which process variable transmitters require the characterization step. Further, if the characterization step is skipped, the diagnostic functionality will remain inactive. Further still, changes to the system may result in errors in the diagnostics as the various measured parameters are being compared against an obsolete baseline. For example, changes in loop loading, controllers, power supplies, load resistors, etc., may require a new characterization to be generated.

In the configuration discussed herein, the process variable transmitter 12 measures the terminal voltage to determine if the transmitter 12 is operating within the proper voltage range. With periodic measurement, an operator can be notified if the voltage is too high or too low. In this mode of operation, the microprocessor 30 compares the loop terminal voltage to high and low thresholds. If the voltage is outside of this threshold range, an error is indicated. The error can be displayed locally, communicated to a local calibration device such as a hand-held device, or transmitted to a remote location, for example over the process control loop 18. This diagnostic can be used immediately upon power up, however, it does not predict how the terminal voltage will change as the output current changes as no baseline has been established.

By determining the terminal voltage $V_{terminal\_voltage}$ and the loop current $I_{loop\_current}$, coefficients for a baseline curve can be established from which to measure changes in the process variable transmitter 12, loop 18 and associated components. The terminal voltage must be measured over a range of loop currents. This range should be sufficiently wide to establish an accurate baseline. Upon power up of the process variable transmitter 12, the device can measure the terminal voltage at the minimum loop current value, for example 3.6 mA. Additional measurements are accumulated as the device is operating and controlling the loop current as a function of the sensed process variable. This allows the device to generate a "live" baseline during normal operation. The baseline can be created using a least square curve fitting technique of the loop current and terminal voltage data. For example, the baseline can be in the form of a first order curve fit in accordance with Equation 1:

$$V_{terminal\ voltage}=V_{power\ supply}-I_{loop\ current}\times R_{loop}$$

Figure 4A:
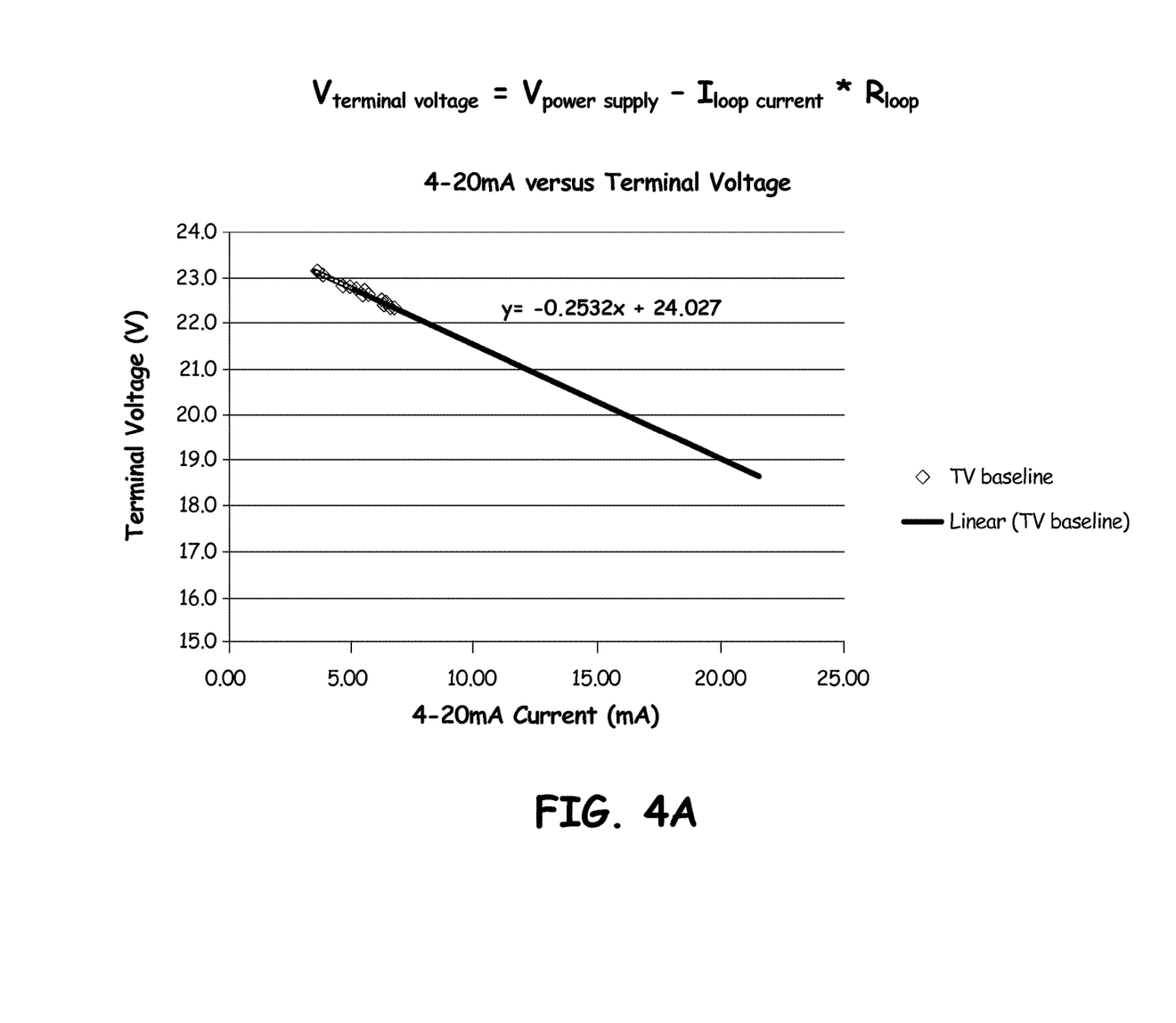
FIG. 4A is a graph of terminal voltage versus loop current.

FIG. 4A is an example graph of Equation 1 showing terminal voltage versus loop current. If a first order curve fit is used, the span used for the characterization should be at a minimum of 15% of the overall range of the loop current. For example, from 3.6 mA-6 mA for a typical 4-20 mA loop. For example, FIG. 4A illustrates a series of data points collected when the loop current varies between about 3.6 and 6 mA. FIG. 4A illustrates the resultant linear terminal voltage baseline obtained using a least squares fit extended to 22 mA. If a higher order curve fit is used, such as a second or third order curve fit, attempts to fit data with a relatively small span may result in large errors. As the loop current changes based upon the sensed process variable, it is not possible to guarantee that the baseline will be established quickly, or possibly at all. Therefore, limiting the span required to establish a "live" baseline will increase the likelihood of eventually creating this baseline. Increasing the number of data points and increasing the span of these points used to curve fit will increase the accuracy of the baseline by reducing the effect of noise of individual measurement points. Prior to establishing the baseline, terminal voltage can be compared to the minimum and maximum allowed terminal voltage. The loop current measured (inside the transmitter) can be compared to the output (micro) current. This should be within a tolerance. The loop current to terminal voltage relationship is unknown—so no comparison can be made until baseline exists.

The microprocessor 30 can determine when the baseline has been established based upon the number of data points collected and/or the span over which they are collected. Once established, the baseline can be used to assess if the power supply voltage is within the transmitter operating range for all of the expected loop current values. Warning of a terminal voltage which is too high or too low can be annunciated by transmission over the two-wire process control loop.

Periodic measurements of the terminal voltage can be compared, one measurement at a time, against the baseline polynomial to determine if the output voltage or loop current has changed compared to the baseline. An alert can be provided if, for example, the terminal voltage is unstable.

If a baseline is established of an unstable process control loop (for example due a wet terminal block), an alert will still be provided indicating that the terminal voltage is too high, too low or unstable. The nonlinear behavior of the process control loop can be detected when comparing it to a first order linear curve fit. For example, in such a situation the data points illustrated in FIG. 4A would be scattered and not arranged linearly.

Figure 4B:
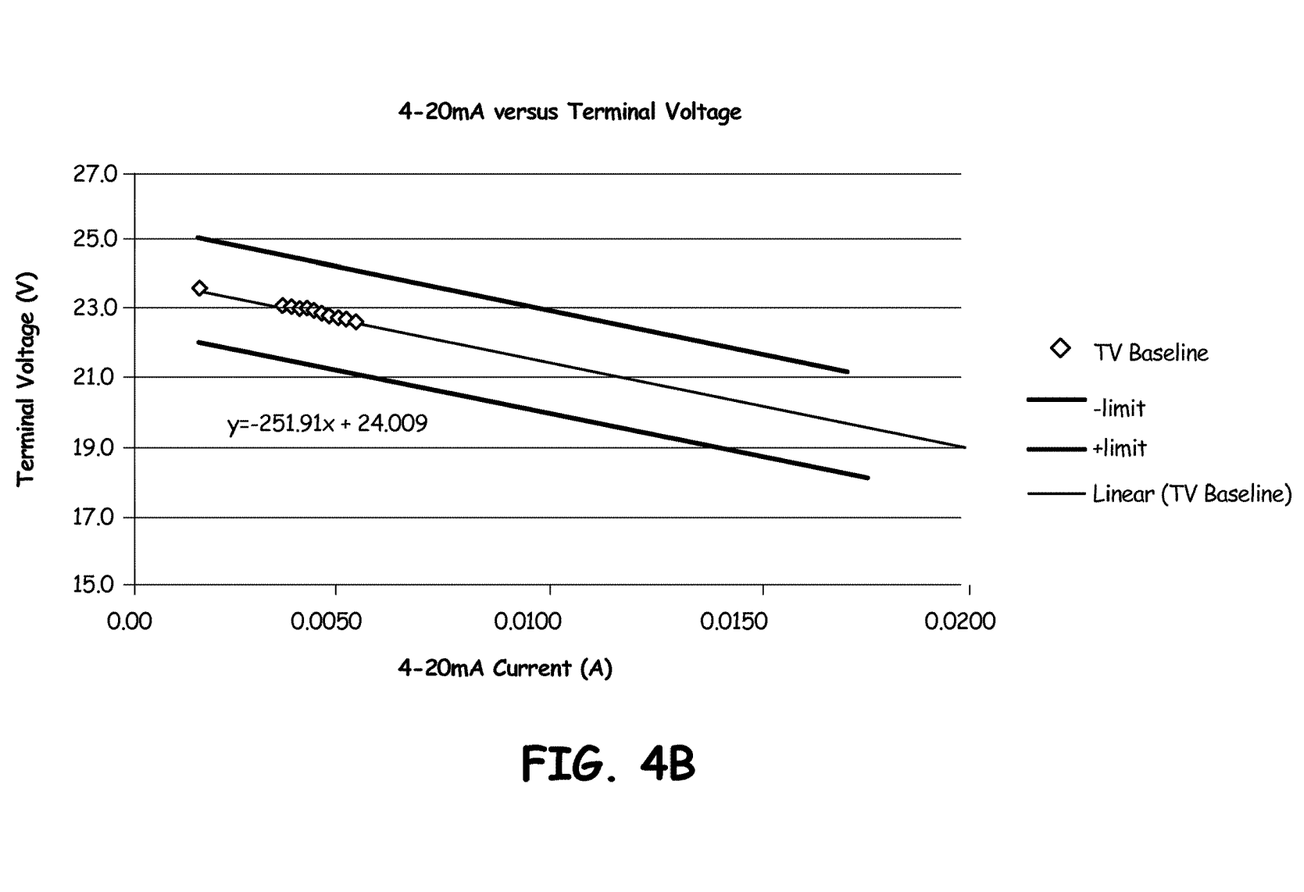
FIG. 4B is a graph of terminal voltage versus loop current which illustrates upper and lower limits with respect to a determined polynomial.
Figure 4C:
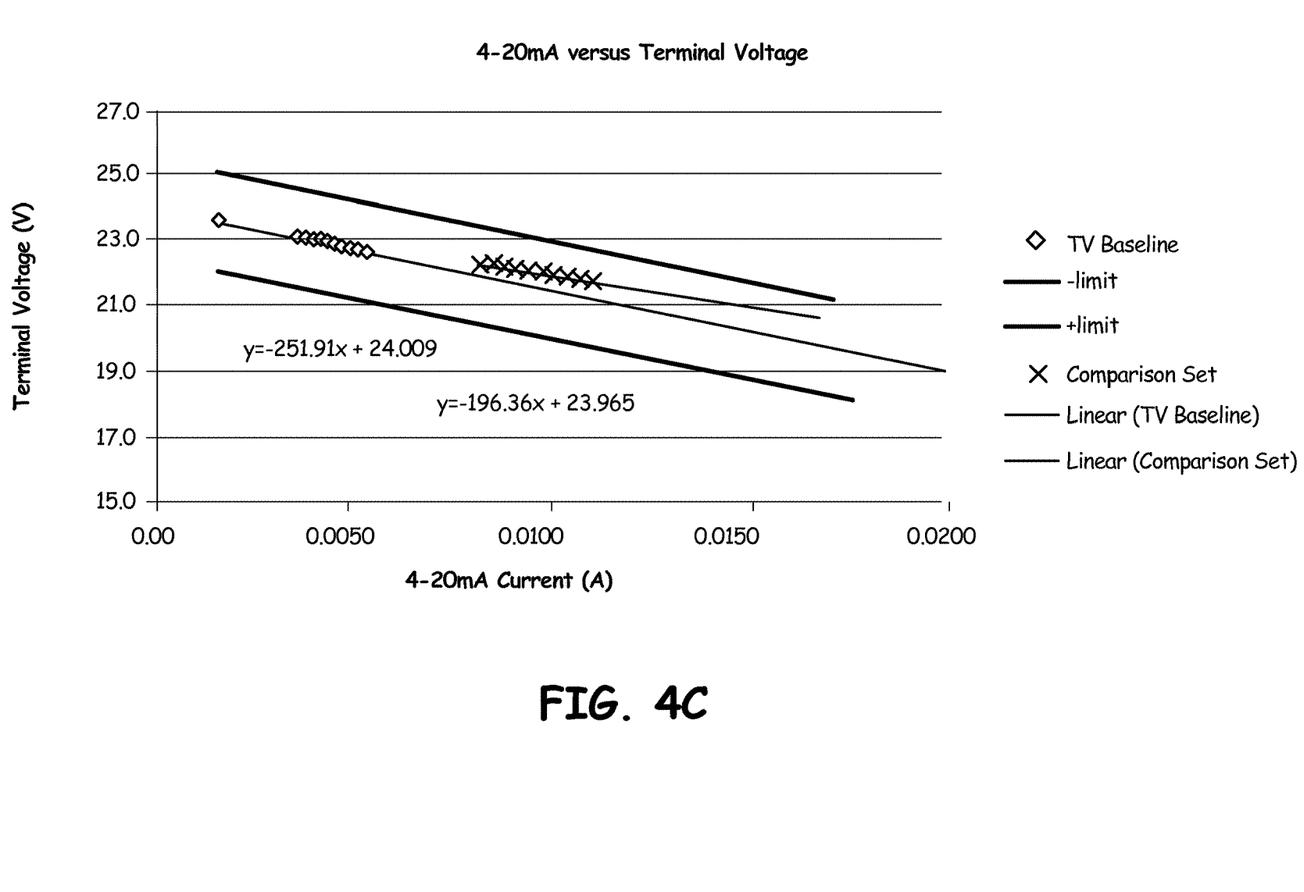
FIG. 4C is a graph of terminal voltage versus loop current which illustrates comparison of a subsequent polynomial with a baseline polynomial.

FIG. 4B is a graph of terminal voltage versus loop current and illustrates high and low boundaries or limits based upon the determined polynomial. The region of collected data is identified in the figure as a "data set" and used to determine the polynomial. If the measured terminal voltage is outside of the illustrated boundaries, an error condition can be set. In another example configuration, subsequent polynomials can be created using the same techniques discussed herein. With this approach, the gain term (resistance) and the offset term (power supply voltage) of the polynomial can be assessed independently. FIG. 4C is a graph of terminal voltage versus loop current used to illustrate this technique. In this example, two sets of data are shown in which all individual points are within the terminal voltage thresholds formed from the baseline data (no failure indicated). The difference in gain between the two data sets can be used to detect a change as illustrated in FIG. 4C. The terminal voltage gain change can be detected before the individual measurements have been detected using the threshold technique illustrated with respect to FIG. 4B. This separation of variables provides additional insight into resistance changes and voltage changes on the loop. Gain or Resistance changes are an indication of current change, directly affecting the output signal. 4/20 mA systems are largely immune to voltage change, so changes of the offset term of the polynomial or power supply voltage is less critical. Data sets which capture changing conditions such as resistance changes or voltage changes will affect both the gain and offset parameters. Slowly changing data sets, where the resistance is changed due to, for example, a moisture in a terminal compartment, will affect the gain term. Voltage offsets (the constant) will be seen as an offset term change. The separate variables can provide better trouble shooting information for a user. The data for obtaining the subsequent polynomials can be obtained during normal operation, provided the output current varies over a sufficiently wide span to obtain accurate gain measurement. In another example configuration, a subsequent polynomial can be obtained in an offline mode in which a user initiates a test sequence to alter the loop current manually. Such an approach could be used for trouble shooting or instrument validation.

Figure 5:
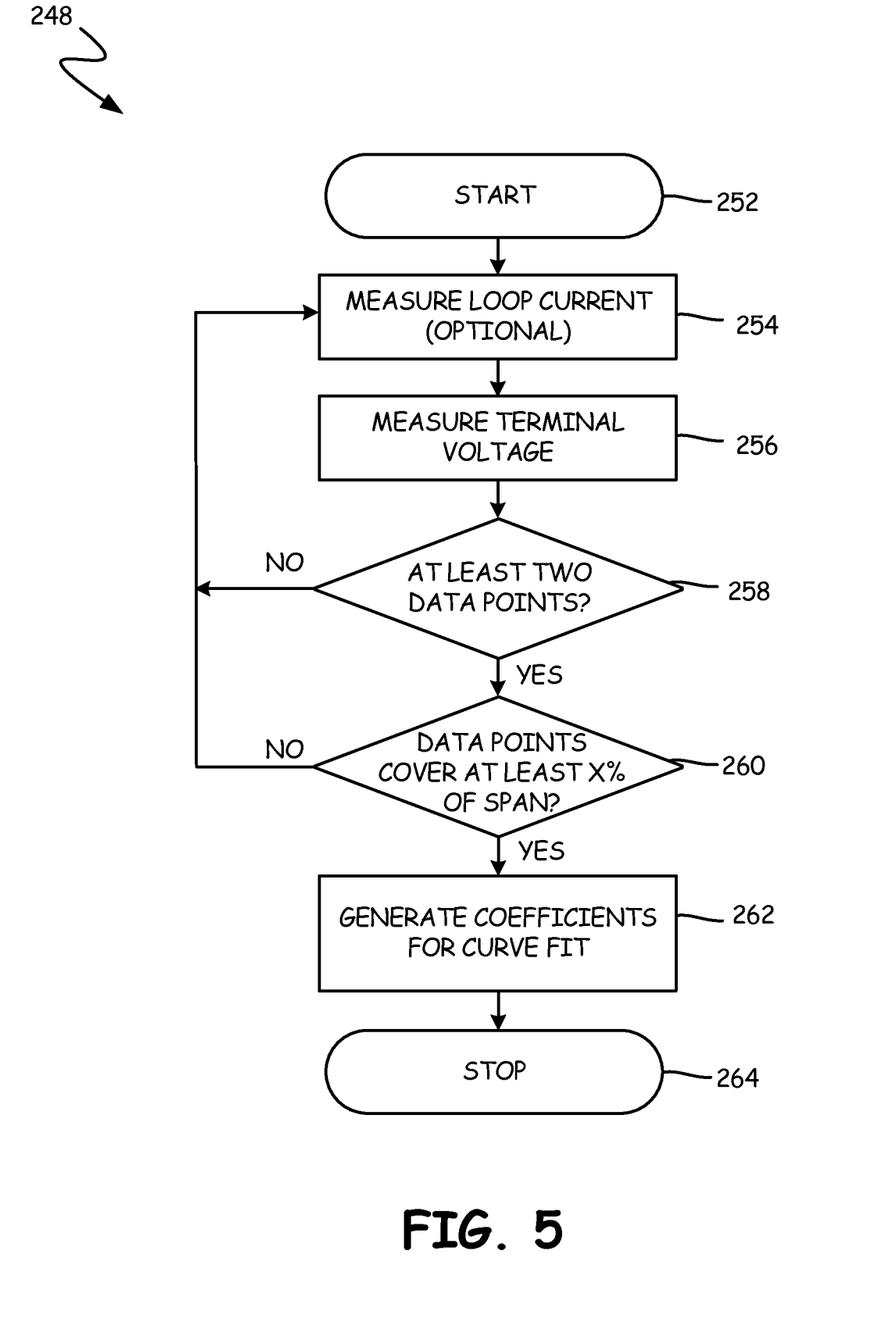
FIG. 5 is a simplified block diagram showing steps used to generate curve fit coefficients during normal operation of a process control loop.

FIG. 5 is a simplified block diagram 248 showing steps used to generate coefficients for a curve fit equation. The procedure 248 begins at start block 252. At blocks 254 and 256 loop current and terminal voltage are measured, respectively. Blocks 258 and 260 are used to determine if sufficient data has been collected to generate a curve fit. If a linear curve fit is used, at least two data points are required as indicated at block 258. Further, in order to obtain a sufficient and accurate curve, the span over which the data is obtained should be at least a selected percentage of the overall span as indicated at block 260. For example, this may be 15% of the overall span, i.e., ranging between 3.6 mA and 6 mA. Once a sufficient number of data points have been obtained, coefficients for a curve fit are generated at block 262. For example, this may be two coefficients for a linear curve fit. The procedure stops at block 264 after the coefficients are stored in a memory 32 accessible by microprocessor 30 shown in FIG. 2. An example will illustrate the sensitivity to terminal voltage noise and limited span measurement. A baseline created with a terminal voltage of 0.1 Vpp error across the full span of loop current results is a 0.1 Vpp error for the baseline. A 0.1 Vpp terminal voltage error measured across a 15% span of loop current results in a baseline error of 0.1 Vpp/0.15 or 0.7V error. Reducing the terminal voltage error through noise filtering or creating baseline measurements across larger loop current spans will result in better baseline for comparison.

Figure 6:
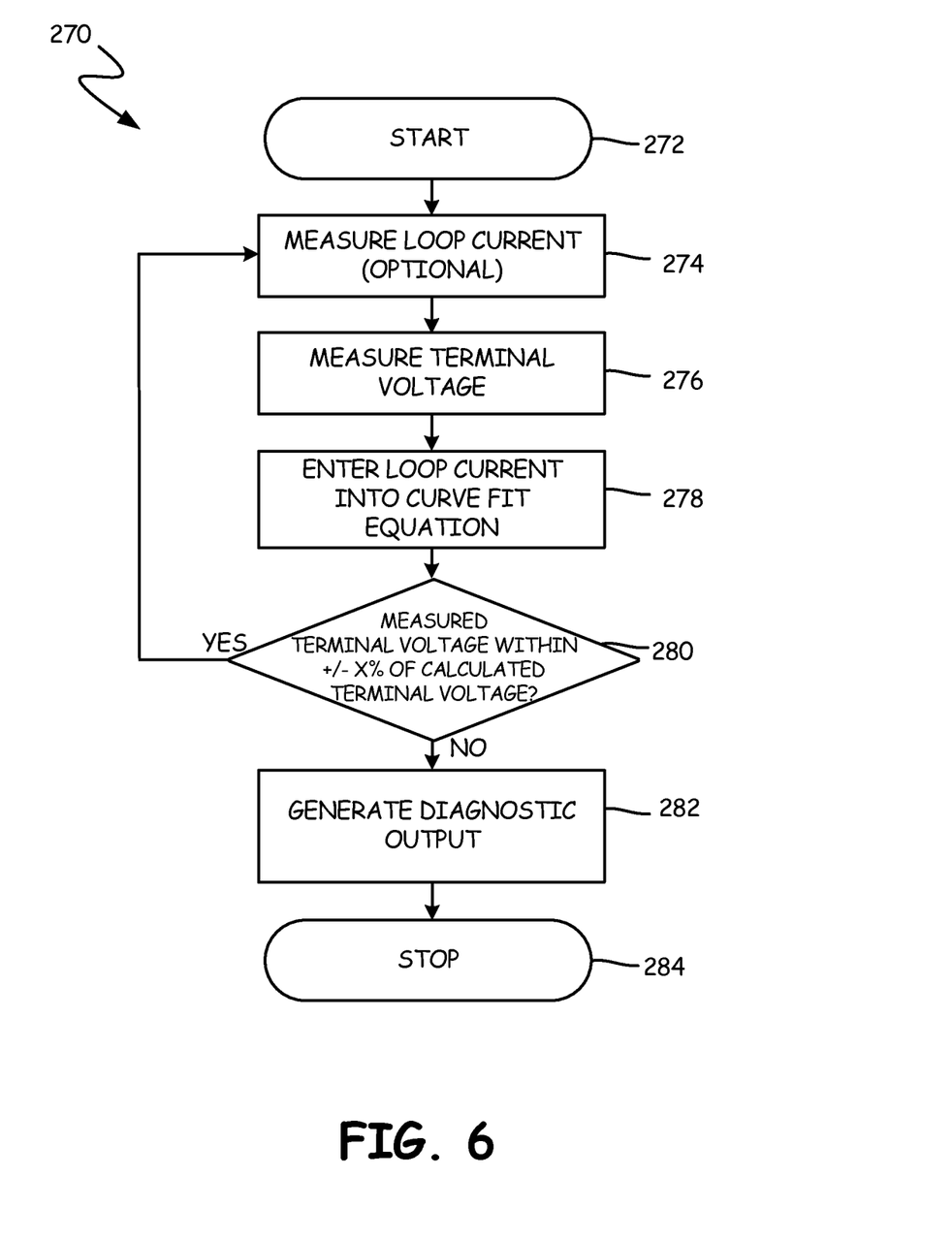
FIG. 6 is a simplified block diagram showing steps used to perform diagnostics based upon the coefficients generated in the steps of FIG. 5.

FIG. 6 is a simplified block diagram showing steps in performing diagnostics on operation of the loop 18 using the curve fit coefficients generated using the procedure illustrated in FIG. 5. The diagnostic procedure 270 starts at block 272. At blocks 274 and 276 loop current and terminal voltage are measured. One of these measured values is applied to the curve fit equation at block 278. (Block 278 is illustrated as solving the curve fit equation using a loop current, however terminal voltage may also be employed.) The calculated parameter is then compared with the measured parameter at block 280. If the two are within an acceptable threshold or limit, percentage or fixed or both a determination that the system is operating nominally is made and the process is repeated. However, if the values are outside of a selected range, a diagnostic output is generated at block 282 and the procedure stops at block 284.

In FIG. 6, although only a single set of data points are illustrated, the diagnostic determination may be made based upon multiple measurements. For example, multiple measurements may be used to generate an average value. In an additional configuration, multiple measurements are used and a diagnostic condition is determined only if more than one of these measurements is outside of a desired range.

In another example configuration, coefficients for multiple curve fit equations are continuously obtained for sets of terminal voltage/loop current data and used to determine if the power supply voltage is changing, for example as an offset from a linear equation. This can also be used to indicate if the load resistor is changing by monitoring the gain term of the linear equation. In such a configuration, the steps illustrated in FIG. 5 are periodically repeated. The coefficients in subsequent measurements are compared to coefficients generated during normal operation of the process control loop. Diagnostics are performed by comparing these two sets of coefficients. Additionally, such a configuration can be used to identify if the loop is operating in an unstable condition. This method has an advantage in that multiple data points are used thereby filtering any high frequency noise. Again, a sufficient span in the loop current needs to be monitored, for example greater than 15% of the overall span, in order to accurately curve fit the data.

In one configuration, the microprocessor 30 measures these values periodically, for example once every second, and uses these measurements for loop diagnostics. By continuously obtaining voltage measurements, the coefficients of the curve fit can be monitored to determine if the voltage is unstable or if the voltage has a large amount of noise present, and a diagnostic output can be provided accordingly. The voltage can be analyzed using a least square fits algorithm. This method also reduces the voltage noise to more accurately measure the DC power supply voltage and the loop resistance over time. As discussed in connection with FIG. 3, the various measurements can also be compensated based upon temperature. The measurements should be performed in synchronization to help ensure their accuracy.

Although the present invention has been described with reference to preferred embodiments, workers skilled in the art will recognize that changes may be made in form and detail without departing from the spirit and scope of the invention. The system can perform an electrical characterization during normal operation of the device by determining the loop resistance and the loop power supply. In one configuration, coefficients of a curve fit are generated during "normal" operation of the process control loop. Normal operation refers to a condition in which the process control loop is operating within nominal parameters. In one configuration, "normal" operation is assumed when the device is initially started or commissioned. In another configuration, normal operation is identified by monitoring multiple data points for loop current and terminal voltage to determine if they are substantially linearly related. A technique is provided in which a curve fit is performed using less than the entire span of the loop current/terminal voltage. Based upon this curve fit, subsequent diagnostics may be performed. In one example configuration, the span for the curve fit generation is about 15% of the total operating span. For example, this may be a span of about 3.6 mA to 6 mA loop current. Thus, the span of the data points may be used to determine if sufficient data has been collected for determining the coefficients of a curve fit. Alternatively to, or in addition to, the span determination, the total number of data points may also be used for determining if a curve fit may be performed. For example, with a linear curve fit, at least two sets of data points must be obtained. Although a linear curve fit is specifically illustrated, other orders of polynomials may also be employed. As additional data is collected, the curve fit coefficients may be recalculated to achieve greater accuracy. The shunt current may also be used to perform diagnostics. The curve fit can be periodically repeated and new coefficients obtained to account for acceptable variations in the loop parameters.

What is claimed is:

1. A two-wire process variable transmitter for use in an industrial process, comprising:
   a process variable sensor configured to sense a process variable of a process fluid of the industrial process;
   output circuitry configured to provide an output on a two-wire process control loop which is related to the sensed process variable;
   terminal voltage measurement circuitry configured to measure a terminal voltage of the process variable transmitter, the terminal voltage comprising a voltage measured across an electrical connection of the two-wire process variable transmitter to the two-wire process control loop;

a microprocessor configured to:
use loop current values for loop currents set in response to the sensed process variable and measured terminal voltages to set coefficients of a polynomial equation which relates loop current and terminal voltage;
perform loop diagnostics on the two-wire process control loop based upon a determined loop current, a further measured terminal voltage and upon the coefficients of the polynomial.

2. The two-wire process variable transmitter of claim 1 wherein the diagnostics include a determination of a resistance of the two-wire process control loop.

3. The two-wire process variable transmitter of claim 1 wherein the diagnostics include a determination of a voltage of a power supply of the two-wire process control loop.

4. The two-wire process variable transmitter of claim 1 including a temperature sensor and wherein the diagnostics are compensated based upon a sensed temperature.

5. The two-wire process variable transmitter of claim 1 wherein measurement of the loop current and terminal voltage are performed in synchronization.

6. The two-wire process variable transmitter of claim 1 wherein the microprocessor further determines additional coefficients of a plurality of polynomial equations for use in performing diagnostics.

7. The two-wire process variable transmitter of claim 1 wherein at least two values of terminal voltage measurements are obtained to determine the coefficients of the polynomial equation.

8. The two-wire process variable transmitter of claim 1 wherein the terminal voltage is measured over a range of loop currents and the coefficients of the polynomial equation are determined after the range of loop currents exceeds a percentage of a total range of the loop current.

9. The two-wire process variable transmitter of claim 8 wherein the percentage is at least 15%.

10. The two-wire process variable transmitter of claim 8 wherein the range of loop currents is at least between 3.6 mA and 6 mA.

11. The two-wire process variable transmitter of claim 1 wherein the microprocessor detects variations in the process control loop based upon the coefficients of the polynomial equation.

12. The two-wire process variable transmitter of claim 1 wherein the microprocessor generates new coefficients of the polynomial equation in response to changes in a relationship between the loop current and terminal voltage.

13. The two-wire process variable transmitter of claim 1 wherein the coefficients of the polynomial equation are determined at startup of the two-wire process variable transmitter.

14. The two-wire process variable transmitter of claim 1 wherein the polynomial equation is of the form:

$$V_{terminal\ voltage} = V_{power\ supply} - I_{loop\ current} \times R_{loop}.$$

15. The two-wire process variable transmitter of claim 1 wherein a loop current value used to perform diagnostics is determined by the microprocessor based upon a value of the sensed process variable.

16. The two-wire process variable transmitter of claim 1 further comprising a loop current measurement circuitry configured to measure a loop current flowing through the two-wire process control loop.

17. A method of performing diagnostics in a two-wire process variable transmitter of an industrial process, comprising:
sensing a process variable of a process fluid of the industrial process;
providing an output on a two-wire process control loop which is related to the sensed process variable;
determining the loop current flowing through the two-wire process control loop when the loop current is related to the sensed process variable;
coupling terminal voltage measurement circuitry to terminals of the two-wire process variable transmitter, the terminal voltage measurement circuitry configured to measure a terminal voltage across terminals which are configured to couple to the two-wire process control loop;
during normal operation of the two-wire process control loop during which the loop current is related to the sensed process variable, determining coefficients of a polynomial equation which relates the determined loop current to the measured terminal voltage ; and
performing diagnostics on the two-wire process control loop based upon the determined coefficients.

18. The method of claim 17 wherein performing diagnostics includes determining a resistance of the two-wire process control loop.

19. The method of claim 17 wherein performing diagnostics includes determining a voltage of a power supply of the two-wire process control loop.

20. The method of claim 17 wherein performing diagnostics includes performing a preliminary diagnostics check.

21. The method of claim 17 including determining additional coefficients of a plurality of polynomial equations for use in performing diagnostics.

22. The method of claim 17 wherein the terminal voltage is measured over a range of loop currents and the coefficients of the polynomial equation are determined when the monitored range of loop currents exceeds a percentage of a total range of the loop current.

23. The method of claim 17 including detecting variations in the process control loop based upon the coefficients of the polynomial equation.

24. The method of claim 17 wherein the coefficients of the polynomial equation are determined at startup of the two-wire process variable transmitter.

* * * * *